United States Patent
Li

(10) Patent No.: US 11,109,008 B2
(45) Date of Patent: Aug. 31, 2021

(54) DATA TRANSMISSION METHOD, DATA LOADING DEVICE, DATA PARSING DEVICE AND DATA TRANSMISSION SYSTEM

(71) Applicant: BOE Technology Group Co., Ltd., Beijing (CN)

(72) Inventor: Yingyi Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 7 days.

(21) Appl. No.: 16/320,687

(22) PCT Filed: Apr. 16, 2018

(86) PCT No.: PCT/CN2018/083140
§ 371 (c)(1),
(2) Date: Jan. 25, 2019

(87) PCT Pub. No.: WO2018/210082
PCT Pub. Date: Nov. 22, 2018

(65) Prior Publication Data
US 2019/0166347 A1 May 30, 2019

(30) Foreign Application Priority Data

May 18, 2017 (CN) .......................... 201710352403.6

(51) Int. Cl.
*H04N 1/32* (2006.01)
*H04N 9/64* (2006.01)
(Continued)

(52) U.S. Cl.
CPC ......... *H04N 11/06* (2013.01); *H04N 1/32144* (2013.01); *H04N 9/64* (2013.01); *H04N 19/467* (2014.11); *H04N 21/43637* (2013.01)

(58) Field of Classification Search
CPC ........ H04N 11/06; H04N 9/64; H04N 19/467; H04N 1/32144; H04N 21/4122;
(Continued)

(56) References Cited

U.S. PATENT DOCUMENTS

2002/0126755 A1* 9/2002 Li .................... H04N 19/119
375/240.12
2004/0002302 A1* 1/2004 Takemoto ............ H04N 1/0014
455/3.06

(Continued)

FOREIGN PATENT DOCUMENTS

CN 102938841 A 2/2013
CN 103778590 A 5/2014
(Continued)

OTHER PUBLICATIONS

International Search Report and Written Opinion of the International Searching Authority (with English language translation of Written Opinion), International Application No. PCT/CN2018/083140, dated Jul. 6, 2018, 13 pp.
(Continued)

*Primary Examiner* — Anner N Holder
(74) *Attorney, Agent, or Firm* — Myers Bigel, P.A.

(57) ABSTRACT

A data transmission method, a data loading device, a data parsing device, and a data transmission system are described herein. The methods include acquiring original video data, acquiring data to be transmitted, processing the original video data according to the data to be transmitted to obtain target video data, and displaying the target video data and the original video data. The methods may further include after displaying the target video data and the original video data, collecting the displayed target video data and original video data, parsing the original video data and the target video data to obtain the data to be transmitted.

16 Claims, 10 Drawing Sheets

(51) Int. Cl.
*H04N 11/06* (2006.01)
*H04N 19/467* (2014.01)
*H04N 21/4363* (2011.01)

(58) Field of Classification Search
CPC ......... H04N 21/4126; H04N 21/42204; H04N 21/431; H04N 21/43637; H04N 21/44008; G06T 1/0021
See application file for complete search history.

(56) References Cited

U.S. PATENT DOCUMENTS

| | | | |
|---|---|---|---|
| 2007/0291110 A1* | 12/2007 | Era | H04N 13/261 |
| | | | 348/42 |
| 2012/0243609 A1* | 9/2012 | Zheng | H04N 19/147 |
| | | | 375/240.15 |
| 2016/0048940 A1 | 2/2016 | Reed et al. | |
| 2019/0166347 A1 | 5/2019 | Li | |

FOREIGN PATENT DOCUMENTS

| | | |
|---|---|---|
| CN | 104202501 A | 12/2014 |
| CN | 105120325 A | 12/2015 |
| CN | 106570816 A | 4/2017 |
| CN | 107124638 A | 9/2017 |

OTHER PUBLICATIONS

First Office Action with English language translation, CN Application No. 201710352403.6, dated Mar. 4, 2019, 11 pp.

* cited by examiner

DATA TRANSMISSION METHOD, DATA LOADING DEVICE, DATA PARSING DEVICE AND DATA TRANSMISSION SYSTEM

CROSS-REFERENCE TO RELATED APPLICATIONS

The present application is a 35 U.S.C. 371 national stage application of PCT International Application No. PCT/CN2018/083140, filed on Apr. 16, 2018, which claims the benefit of Chinese Patent Application No. 201710352403.6, filed on May 18, 2017, the contents of which are incorporated herein by reference in their entireties. The above-referenced PCT International Application was published in the Chinese language as International Publication No. WO 2018/210082 A1 published on Nov. 22, 2018.

FIELD

The present disclosure relates to the field of wireless communication, and particularly to a data transmission method, a data loading device, a data parsing device, and a data transmission system.

BACKGROUND

Currently, wireless communication, such as WiFi (Wireless Fidelity), Bluetooth, etc., is already very common in people's daily lives. In practical applications, in order to avoid communication interference, different wireless communication methods need to work in different frequency bands allocated in advance. For example, WiFi generally operates in the 2.4 GHz and 5.0 GHz bands, and Bluetooth typically operates in the 2400-2483.5 MHz bands. In practical applications, the wireless spectrum resources are limited, so the frequency bands that may be allocated for wireless communication are also very limited, which greatly restricts the development of wireless communication technology.

SUMMARY

According to a first aspect of the present disclosure, there is provided a data transmission method, which comprises:
acquiring original video data;
acquiring data to be transmitted;
processing the original video data according to the data to be transmitted to obtain target video data;
displaying the target video data and the original video data.

Optionally, the original video data comprises a plurality of original video frames, and each original video frame comprises a plurality of original pixel points; and wherein processing the original video data according to the data to be transmitted to obtain target video data comprising:
converting the data to be transmitted into a plurality of binary data strings, wherein the plurality of binary data strings and the plurality of original video frames are in one-to-one correspondences, each binary data string comprising a plurality of data segments, and each data segment corresponds to an original pixel point of the original video frame corresponding to the binary data string to which said each data segment belongs;
for each binary data string, changing the grayscale value of the original pixel point corresponding to each data segment of the binary data string according to the grayscale change value corresponding to said each data segment in order to obtain a plurality of target pixel points, wherein a plurality of target pixel points constitute one target video frame, and a plurality of target video frames corresponding to the plurality of binary data strings constitute the target video data.

Optionally, the grayscale change value comprises at least one of a grayscale change value of a red subpixel, a grayscale change value of a green subpixel, and a grayscale change value of a blue subpixel.

Optionally, the changing the grayscale value of the original pixel point corresponding to each data segment of the binary data string according to the grayscale change value corresponding, to said each data segment comprises:
decreasing the grayscale value of the corresponding original pixel point by the first change value in response to the data segment being 0;
increasing the grayscale value of the corresponding original pixel point by a second change value in response to the data segment being 1.

Optionally, the method further comprises: after displaying the target video data and the original video data:
collecting the displayed target video data and the displayed original video data;
for each target video frame in the target video data, acquiring a grayscale change value of each target pixel point in the target video frame compared to the corresponding original pixel point and acquiring a data segment corresponding to the grayscale change value so as to obtain a binary data string, and converting the binary data string into original data, wherein the original data corresponding to the plurality of target video frames constitute the data to be transmitted.

According to a second aspect of the present disclosure, a data loading device is provided. The device comprises:
an acquirer configured to acquire original video data and data to be transmitted;
a processor, configured to process the original video data according to the data to be transmitted to obtain target video data;
a display configured to display the target video data and the original video data.

Optionally, the original video data comprises a plurality of original video frames and each of the original video frames comprises a plurality of original pixel points; and the processor is further configured to:
convert the data to be transmitted into a plurality of binary data strings, wherein the plurality of binary data strings and the plurality of original video frames are in one-to-one correspondences, each binary data string comprises a plurality of data segments, and each data segment corresponds to an original pixel point of the original video frame corresponding to the binary data string to which said each data segment belongs;
for each binary data string, change the gray scale value of the original pixel point corresponding to each data segment of the binary data string according to the grayscale change value corresponding to said each data segment in order to obtain a plurality of target pixel points, wherein a plurality of target pixel points constitute one target video frame, and a plurality of target video frames corresponding to the plurality of binary data strings constitute the target video data.

According to a third aspect of the present disclosure, a data parsing device is provided. The device comprising:

a collector configured to collect original video data and target video data, the target video data is obtained by processing the original video data according to the data to be transmitted;

a parser configured to parse the original video data and the target video data to obtain the data to be transmitted.

Optionally, the original video data comprises a plurality of original video frames, each of the original video frames comprises a plurality of original pixel points, the target video data comprises a plurality of target video frames, and each of the target video frames comprises a plurality of target pixel points, and wherein the plurality of target video frames and the plurality of original video frames are in one-to-one correspondences, and each target pixel point corresponding to an original pixel point of the original video frame according to the target video frame to which the target pixel point belongs;

wherein the parser is further configured to: for each target video frame, acquire a grayscale change value of each target pixel point in the target video frame compared to the corresponding original pixel point and acquire a data segment corresponding, to the grayscale change value to obtain a binary data string, and configured to convert the binary data string into original data, wherein the original data corresponding to the plurality of target video frames constitute the data to be transmitted.

BRIEF DESCRIPTION OF THE DRAWINGS

In order to more clearly illustrate the technical solutions in the embodiments of the present disclosure, the drawings used in the description of the embodiments will be briefly described below.

DETAILED DESCRIPTION

In order to make the objects, technical solutions and advantages of the present disclosure more apparent, the present disclosure will be clearly and completely described hereinafter in a detailed manner with reference to the accompanying drawings.

Figure 1:
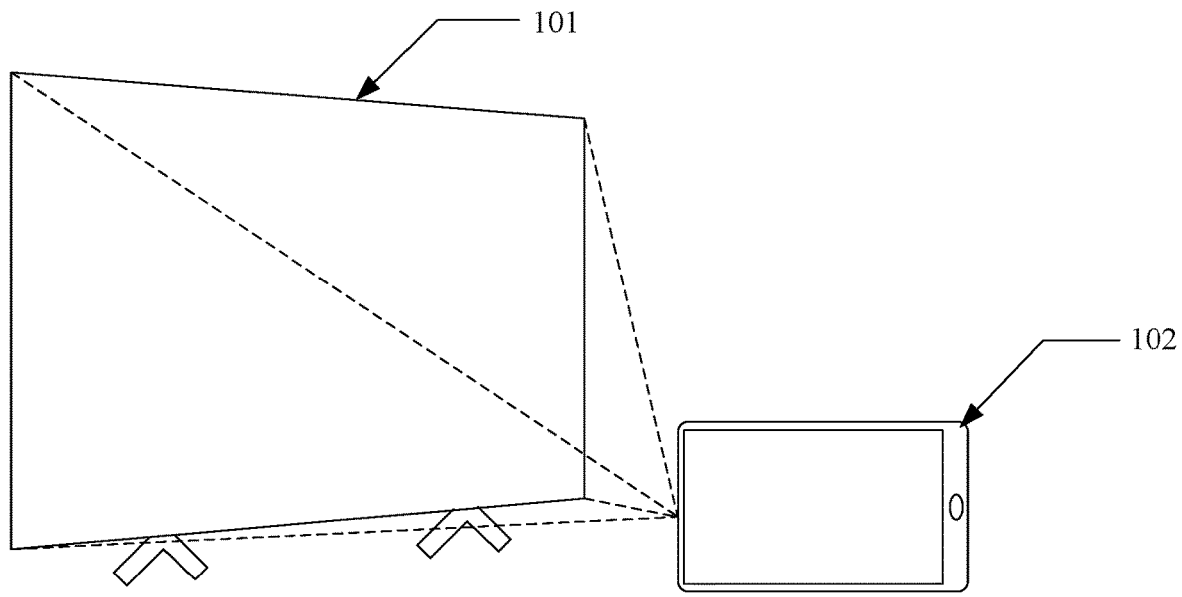
FIG. 1 is a schematic diagram of a data transmission system provided by an embodiment of the present disclosure.

FIG. 1 is a schematic diagram of a data transmission system according to an embodiment of the present disclosure. As shown in FIG. 1, the data transmission system comprises a data loading device 101 and a data parsing device 102. The data loading device 101 may be an electronic device with a video playing function, such as a television, a computer, etc., and the data parsing device 102 may be an electronic device with a shooting function, such as a smart phone, a tablet computer, etc., which are not specifically limited in the embodiments of the present disclosure.

The data loading device 101 may process the original video data of the video to be played by using the data to be transmitted to obtain the target video data, and display the original video data and the target video data when the video is played. The data parsing device 102 may collect the original video data and the target video data displayed by the data loading device 101 when playing the video by capturing or scanning, and parse the original video data and the target video data to obtain the data to be transmitted. In other words, the data transmission system may perform data transmission through the video frames of the video being played. Since the display and collection of video frames are performed in the visible light band, the data transmission system does not need to occupy the wireless spectrum resources for data transmission, and may be free from limited wireless spectrum resources.

Figure 2:
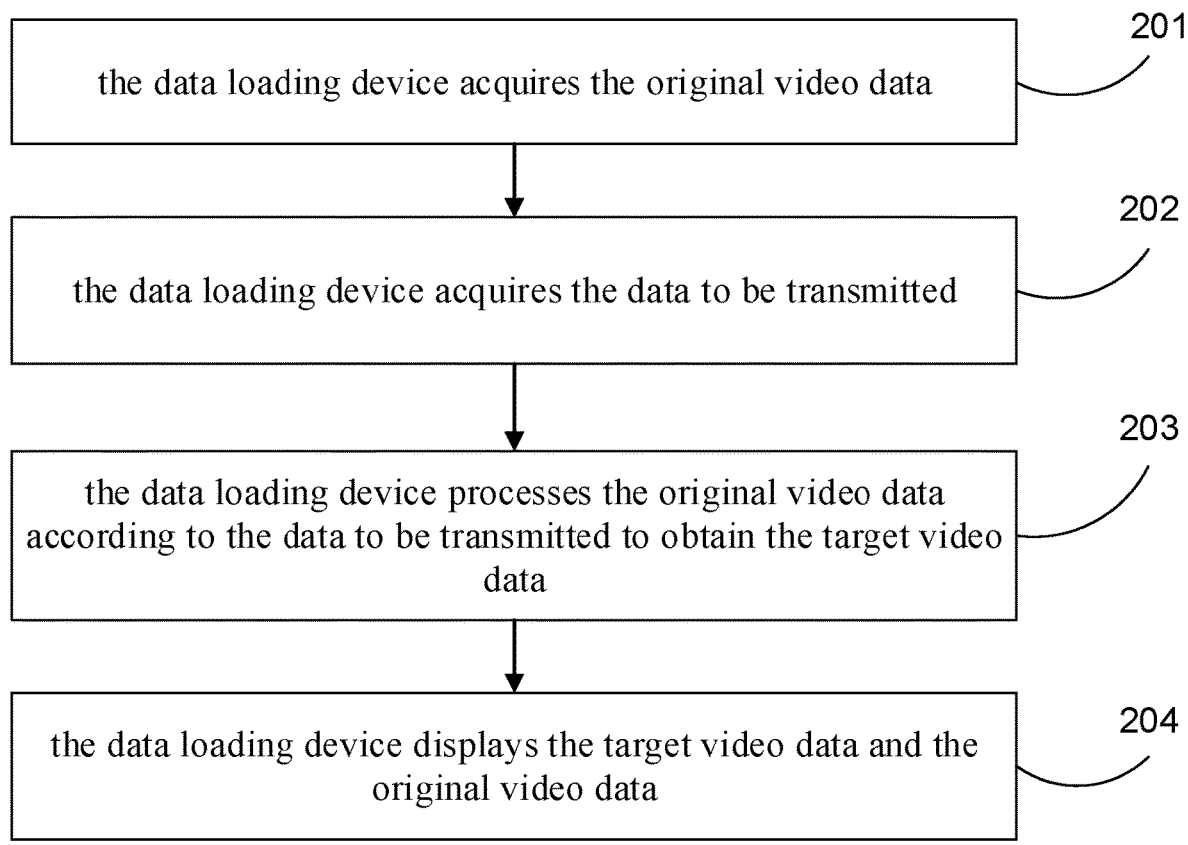
FIG. 2 is a flowchart of a data transmission method according to an embodiment of the present disclosure.

FIG. 2 is a flow chart of an exemplary data transmission method, in accordance with an embodiment. As shown in FIG. 2, the data transmission method comprises the following steps 201-204.

At step 201, the data loading device acquires the original video data.

At step 202, the data loading device acquires the data to be transmitted.

At step 203, the data loading device processes the original video data according to the data to be transmitted to obtain the target video data. Therefore, the target video data comprises the processed original video data and may reflect the data to be transmitted.

At step 204, the data loading device displays the target video data and the original video data.

In summary, in the data transmission method provided by the embodiments of the present disclosure, the data loading device processes the original video data with the data to be transmitted to obtain the target video data, and displays the original video data and the target video data. The data parsing device that collects the displayed original video data and the target video data may then parse the original video data and the target video data to obtain the data to be transmitted. Since the display and collection of the original video data and the target video data are performed in the visible light band, there is no need to occupy the wireless spectrum resources. Therefore, the data transmission method provided by the embodiments of the present disclosure may be free from the limited wireless spectrum resources.

Figure 3A:
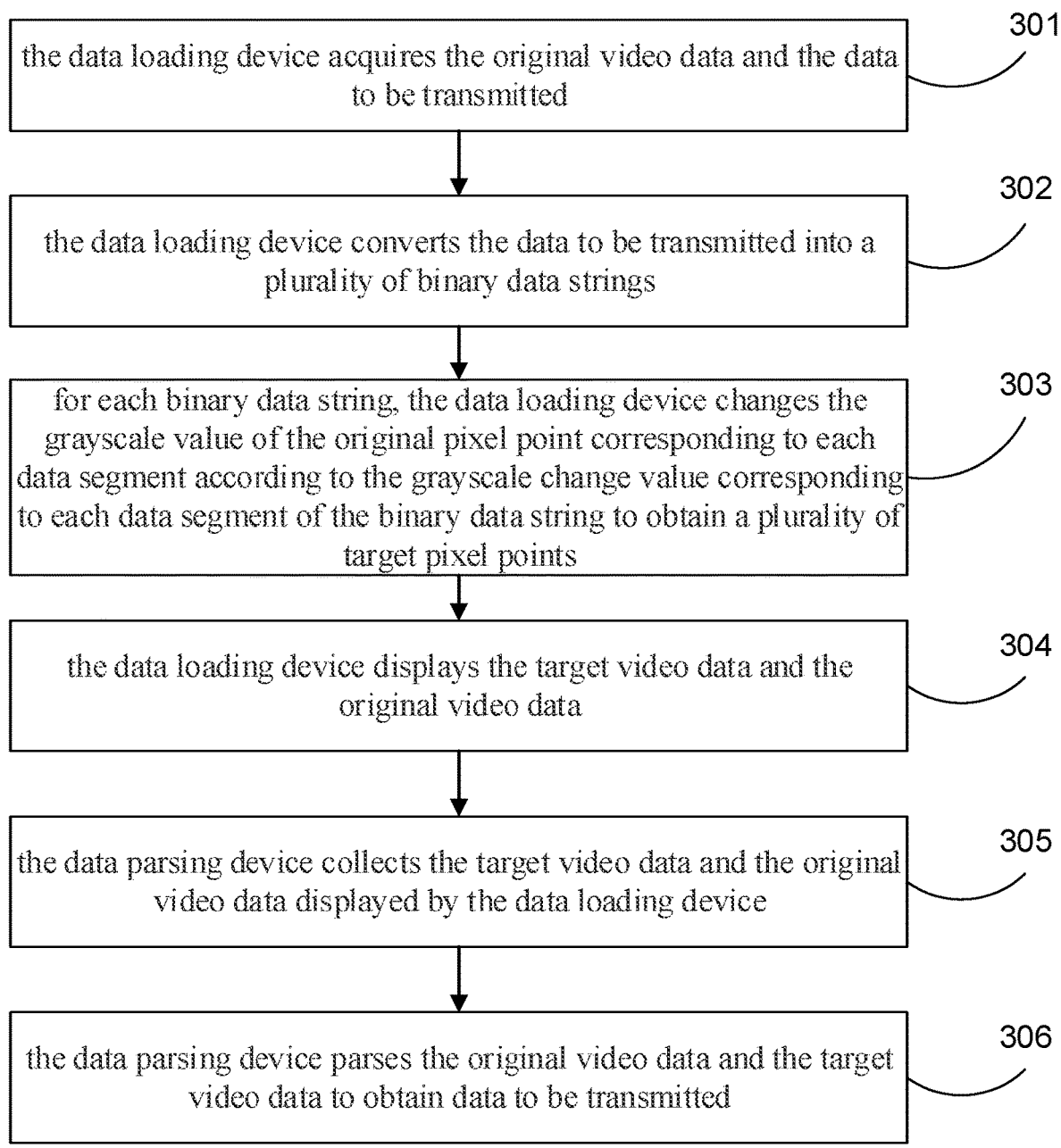
FIG. 3A is a flowchart of another data transmission method according to an embodiment of the present disclosure.

FIG. 3A is a flowchart of another data transmission method according to an embodiment. As shown in FIG. 3A, the data transmission method may be implemented in the data transmission system as shown in FIG. 1, and may comprise the following steps 301-306.

At step 301, the data loading device acquires the original video data and the data to be transmitted.

The data loading device provided by the embodiment of the present disclosure may perform data transmission when playing video. In order to achieve this, the data loading device needs to acquire the video data of the video to be played and the data to be transmitted, wherein the video data of the video to be played is the original video data described above. The original video data comprises a plurality of original video frames, and each original video frame comprises a plurality of original pixel points. In this way, in the subsequent steps, the data loading device may process the original video data by using the data to be transmitted to obtain the target video data, and perform video play based on the original video data and the target video data, thereby performing data transmission during video dplay.

In some embodiments, the data loading device may receive a video play command sent by a remote controller, a data parsing device, or the like, and the video play command is used to instruct the data loading device to play the video, After receiving the video play instruction, the data loading device may acquire the original video data. Then, the data loading device may further receive a data transmission instruction sent by the remote controller, the data parsing device, or the like, and acquire the data to be transmitted after receiving the data transmission instruction, Of course, in some embodiments, the data loading device may also acquire both the original video data and the data to be transmitted after receiving the video play instruction. Moreover, in some embodiments, the data loading device may also acquire the data to be transmitted before playing the video. When the data loading device acquires the data to be transmitted and detects that it is playing a video, the data loading device may acquire the original video data to perform data transmission when the video is played. In this case, the data loading device may prompt the user to receive the data by using the data parsing device through a pop-up window, a prompt sound, or the like.

For example, the user Xiao Ming wants to make his mobile phone receive data while watching the video. At this time, Xiao Ming may use the remote controller to turn on the TV, and may use the remote controller to control the TV to play the video named "To the Sky Kingdom" which he wants to watch. Then, Xiao Ming may also use the remote controller to send a data transmission instruction to the television, After receiving the data transmission instruction, the television may acquire the locally, stored data to be transmitted, which may be the pre-downloaded video data or the like according to the user's needs.

It should be noted that the timing at which the above data loading device acquires the original video data and the data to be transmitted is merely exemplary, and there may be other timings for acquiring the original video data and the data to be transmitted.

The data loading, device may process the original video data according to the data to be transmitted, as described in steps 302 and 303.

At step 302, the data loading device converts the data to be transmitted into a plurality of binary data strings.

The data loading device may convert the acquired data to be transmitted into binary data and split the binary data into a plurality of binary data strings, Each binary data string corresponds to one original video frame, each binary data string comprises a plurality of data segments, and each data segment corresponds to one original pixel point of said one original video frame.

The number of data segments comprised in the binary data string may be the same as the number of original pixel points comprised in the original video frame corresponding to the binary data string. That is, the data segments in the binary data string may correspond to the original pixel points in the corresponding original video frame. Of course, the number of data segments comprised in the binary data string may also be smaller than the number of original pixel points comprised in the corresponding original video frame. In this case, a part of the original pixel points comprised in the original video frame may correspond to the data segments of the binary data string, and other original pixel points do not correspond to the data segments, which are not specifically limited by the embodiments of the present disclosure.

It should be noted that the length of the above data segment may be 1 bit. When the length of the data segment is 1 bit, the data segment may be 0 or 1. Of course, the length of the data segment may also be greater than 1 bit, which is not specifically limited in the embodiments of the present disclosure.

In the following, the technical process of splitting the above binary data into a plurality of binary data strings will be described by taking the length of the data segment as 1 bit as an example. The technical process when the length of the data segment is greater than 1 bit is the same as the technical process with the length of the data segment being 1 bit.

Figure 3B:
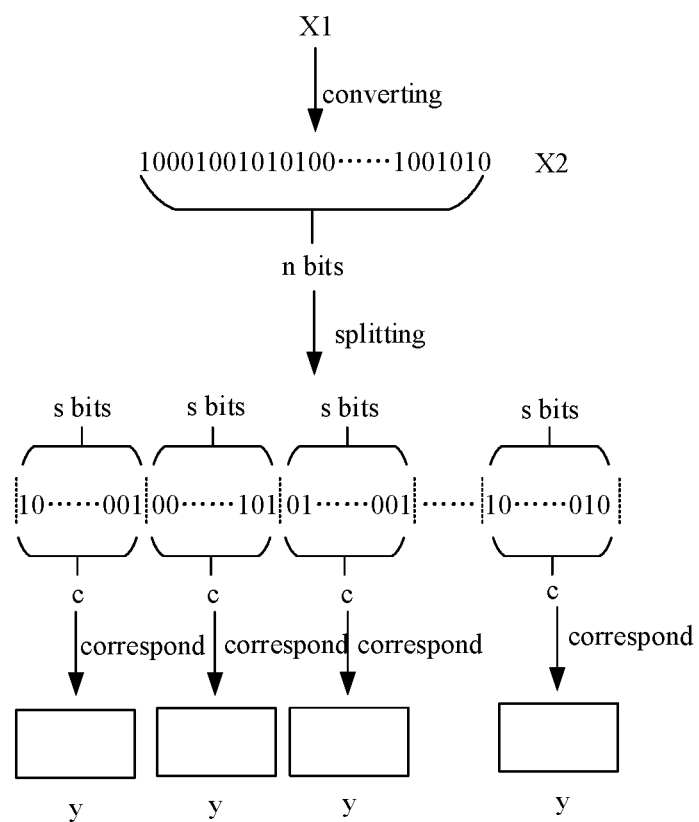
FIG. 3B is a schematic diagram of splitting binary data into multiple binary data strings according to an embodiment of the present disclosure.

As shown in FIG. 3B, the data loading device may convert the acquired data X1 to be transmitted into binary data X2 of length n bits, and the data loading device may also determine that the number of original pixel points comprised in the original video frame is s. Then, the data loading device may sequentially intercept a plurality of binary data strings c from the binary data X2 from beginning to end, and ensure that the length of each intercepted binary data string c is s bits. Each of the intercepted binary data strings c corresponds to one original video frame y, and each data segment in the binary data string corresponds to one of the original pixel points in the corresponding original video frame.

It should be noted that the process of splitting the binary data strings shown in FIG. 3B is merely exemplary, and of course, there are other split modes. For example, the data loading device may sequentially intercept the plurality of binary data strings c from the end to the beginning in the binary data X2, or the length of the binary data string intercepted by the data loading device may be less than s bits or the like, which is not limitative.

As described above, each data segment in the binary data string corresponds to one original pixel point in the original video frame corresponding to the binary data string. Of course, there may be many ways in which the data segments correspond to the original pixel points. FIGS. 3C, 3D, 3E, and 3F are four exemplary corresponding manners provided by the embodiments of the present disclosure.

Figure 3C:
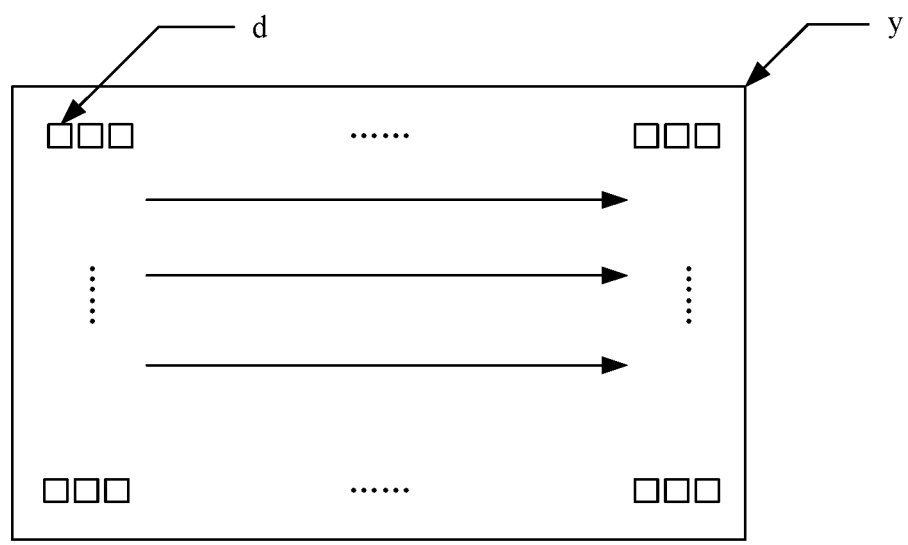
FIG. 3C is a schematic diagram of a corresponding manner of a data segment and original pixel points provided by an embodiment of the present disclosure.

As shown in FIG. 3C, the data segments in the binary data string may sequentially correspond to the original pixel points d in the original video frame y as indicated by the arrows in FIG. 3C, That is, the original pixel points in the original video frame correspond to the data segments in the binary data string row-by-row from left to right.

Figure 3D:
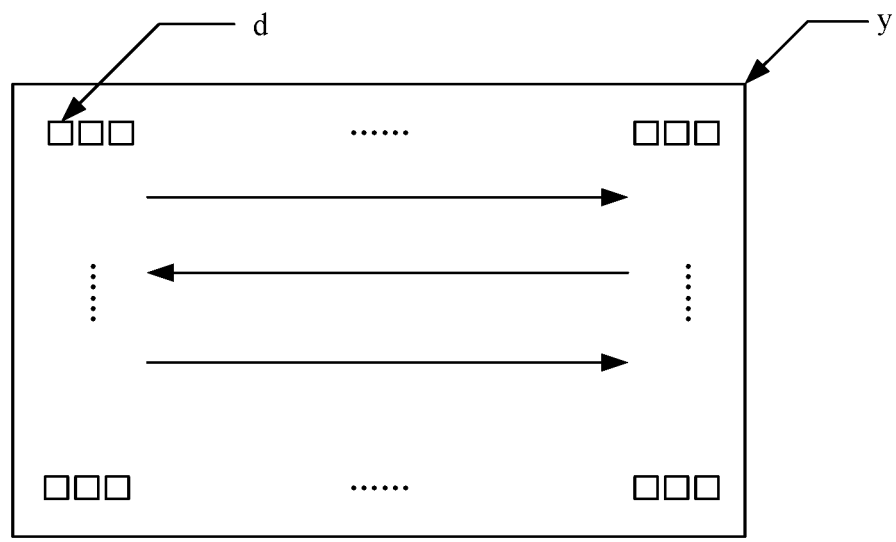
FIG. 3D is a schematic diagram of another corresponding manner of a data segment and original pixel points provided by an embodiment of the present disclosure.

As shown in FIG. 3D, the data segments in the binary data string may sequentially correspond to the original pixel points d in the original video frame y as indicated by the arrows in FIG. 3D. That is, the original pixel points in the original video frame correspond to the data segments in the binary data string row-by-row from end to end.

Figure 3E:
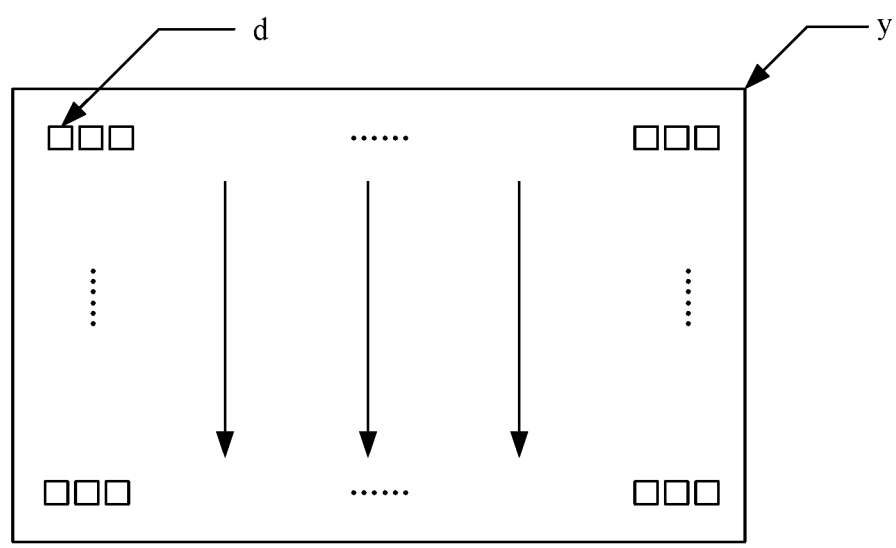
FIG. 3E is a schematic diagram of still another corresponding manner of a data segment and original pixel points provided by an embodiment of the present disclosure.

As shown in FIG. 3E, the data segments in the binary data string may sequentially correspond to the original pixel points d in the original video frame y as indicated by the arrows in FIG. 3E. That is, the original pixel points in the original video frame correspond to the data segments in the binary data string column-by-column from top to bottom.

Figure 3F:
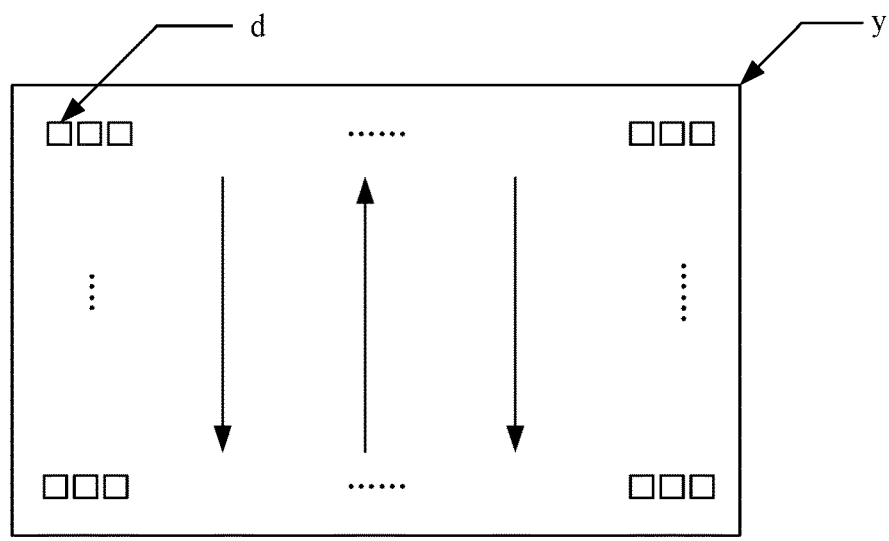
FIG. 3F is a schematic diagram of yet another corresponding manner of a data segment and original pixel points provided by an embodiment of the present disclosure.

As shown in FIG. 3F, the data segments in the binary data string may sequentially correspond to the original pixel points d in the original video frame y as indicated by the arrows in FIG. 3F. That is, the original pixel points in the original video frame correspond to the data segments in the binary data string column-by-column from end to end.

It should be noted that the corresponding manners shown in FIGS. 3C, 3D, 3E, and 3F are merely exemplary, and are not intended to limit the disclosure.

At step 303, for each binary data string, the data loading device changes the grayscale value of the original pixel point corresponding to each data segment according to the grayscale change value corresponding to each data segment of the binary data string to obtain a plurality of target pixel points. The plurality of target pixel points constitute one target video frame, and the plurality of target video frames corresponding to the plurality of binary data strings constitute the target video data.

In the following, the technical process of step 303 will be described by taking the length of the data segment as 1 bit as an example. When the length of the data segment is greater than 1 bit, the technical process of step 303 is the same as the technical process of step 303 when the length of the data segment is 1 bit.

The data loading device may store a mapping relationship between the data segment and the grayscale change value, and the mapping relationship may be as shown in Table 1:

TABLE 1

| Data segment | Grayscale change value |
|---|---|
| 1 | +n |
| 0 | −m |

It should be noted that the grayscale change value may comprise at least one of a grayscale change value of a red sub-pixel, a grayscale change value of a green sub-pixel, and a grayscale change value of a blue sub-pixel.

For each binary data string, the data loading device may acquire a grayscale change value corresponding to each data segment based on a mapping relationship between the stored data segment and the grayscale change value, and then change the grayscale change value of the original pixel point corresponding to the each data segment according to the grayscale change value. As shown in Table 1, the data loading device may reduce the grayscale value of the original pixel point corresponding to the data segment by the first change value in when the data segment is 0, and the data loading device may increase the grayscale value of the original pixel point corresponding to the data segment by a second change to value n when the data segment is 1. By changing the grayscale value of the original pixel point corresponding to each data segment, a plurality of target pixel points may be obtained, and the plurality of target pixel points may constitute a target video frame.

Figure 3G:
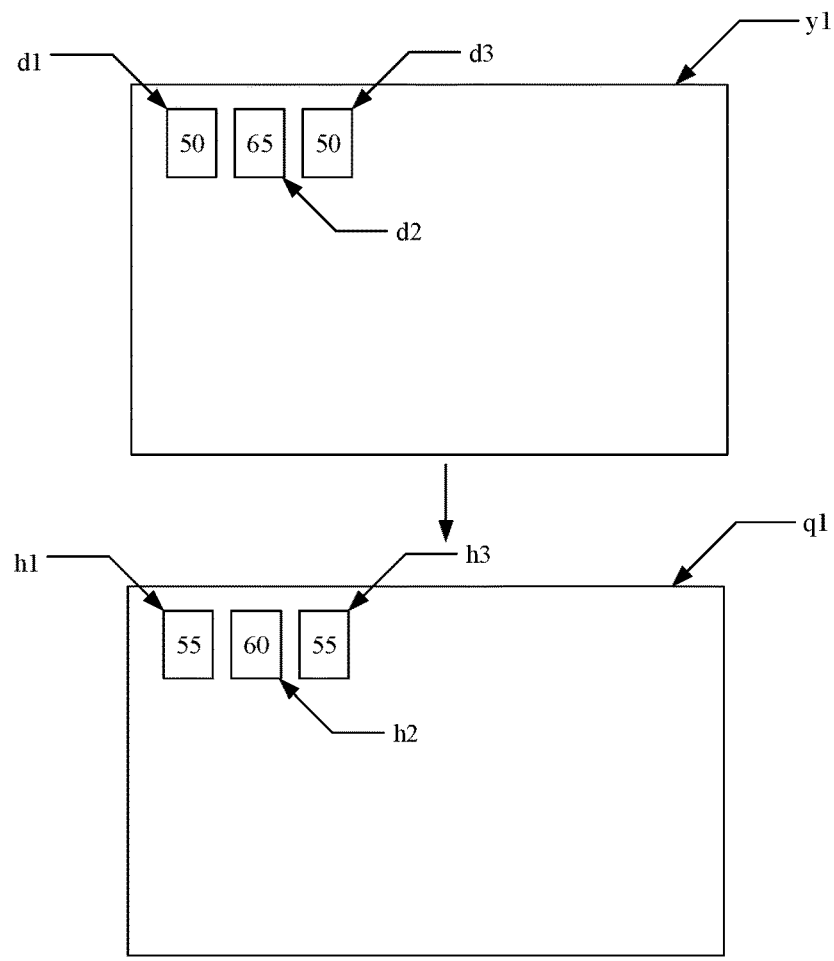
FIG. 3G is a schematic diagram of changing grayscale values of original pixel points corresponding to a data segment to obtain target pixel points according to an embodiment of the present disclosure.

For example, as shown in FIG. 3G, the first three original pixel points of the first line in the original video frame y1 are original pixel points d1, d2, and d3, respectively, and the grayscale values of the original pixel points d1, d2, and d3 are 50, 65 and 50, respectively. If the data segments corresponding to the original pixel points d1, d2, and d3 are 1, 0, and 1, respectively, and the values of m and n in the above Table 1 are both 5, the data loading device may increase the grayscale value of the original pixel point d1 by 5 to obtain a target pixel point h1 corresponding to the original pixel point d1, and the grayscale value of the target pixel point h1 is 55. Similarly, the data loading device may also obtain target pixel points h2 and h3 corresponding to the original pixel points d2 and d3, respectively, and the grayscale values of the target pixel points h2 and h3 are 60 and 55, respectively. A plurality of target pixel points may be obtained by performing the same changes as the original pixel points d1, d2, and d3 on the grayscale value of each original pixel point in the original video frame y1, and the plurality of target pixel point s may constitute a target video frame q1 corresponding to the original video frame y1. The target pixel points h1, h2, and h3 are the first three target pixel points of the first line in the target video frame q1. It should be noted that the grayscale change value may comprise a grayscale change value of a red sub-pixel, a grayscale change value of a green sub-pixel, and a grayscale change value of a blue sub-pixel. In this case, increasing the grayscale value of the original pixel point d1 by 5 may mean that the grayscale value of the red subpixel of the original pixel point d1, the grayscale value of the green subpixel, and the grayscale value of the blue subpixel are increase by 5, respectively, to obtain the target pixel h1 point.

Figure 3H:
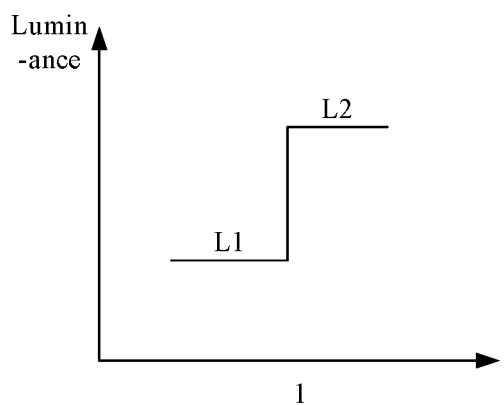
FIG. 3H is a schematic diagram showing changes in luminance of original pixel points corresponding to data segment 1 compared to luminance of corresponding target pixel points according to an embodiment of the present disclosure.
Figure 3I:
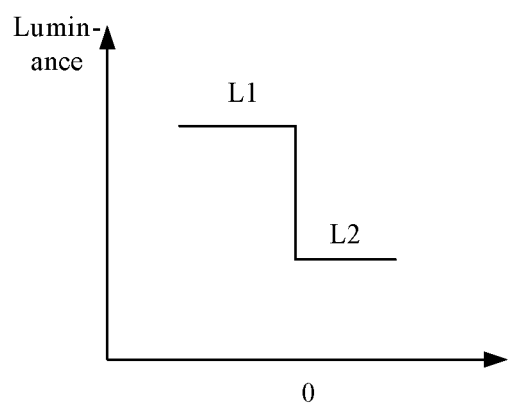
FIG. 3I is a schematic diagram showing changes in luminance of original pixel points corresponding to data segment 0 compared to luminance of corresponding target pixel points according to an embodiment of the present disclosure.

As described above, the data loading device may reduce the grayscale value of the original pixel point corresponding to the data segment by the first change value m to obtain a corresponding target pixel point when the data segment is 0, and the data loading device may increase the grayscale value of the original pixel point corresponding to the data segment by a second change value n to obtain a corresponding target pixel point when the data segment is 1. However, the increase of the grayscale value increases the luminance of the target pixel point compared to the luminance of the corresponding original pixel point, and the reduction of the grayscale value reduces the luminance of the target pixel point compared to the luminance of the corresponding original pixel point. As shown in FIG. 3H, the luminance L1 of the original pixel point corresponding to the data segment 1 is smaller than the luminance L2 of the corresponding target pixel point, and as shown in FIG. 3I, the luminance L1 of the original pixel point corresponding to the data segment 0 is larger than the luminance L2 of the corresponding target pixel point. Therefore, the data loading device may load the data to be transmitted based on the change of the luminance of each target pixel point in the target video frame compared to the luminance of the corresponding original pixel point, and the data parsing device only needs to judge the change of the luminance of the target pixel point compared to the luminance of the corresponding original pixel point so as to obtain the data to be transmitted. This data transmission method is relatively simple, and the hardware requirements of the data parsing device are low.

It should be noted that the first change value in and the second change value n may be preset by a technician. In an embodiment of the present disclosure, m and n may each be a positive number less than 50. It should be understood that the larger the values of m and n, the larger the difference in luminance between the target pixel point and the corresponding original pixel point, and the easier the data parsing device performs data parsing, but the video picture is more easily distorted. In an embodiment of the present disclosure, the m and n may both be 5, which ensures that the data parsing device may easily perform data parsing, and on the other hand, avoids the phenomenon of video picture distortion.

It should also be noted that the content shown in table 1 above are merely exemplary and it does not limit the present disclosure. In an embodiment, the data loading device may increase the gray; scale value of the original pixel point when the data segment is 0, and the data loading device may reduce the grayscale value of the original pixel point when the data segment is 1; or, the data loading device may increase the grayscale value of the original pixel point when the data segment is 0 or 1; or, the data loading device may reduce the grayscale value of the original pixel point when the data segment is 0 or 1. The embodiments of the present disclosure do not specifically limit this.

At step 304, the data loading device displays the target video data and the original video data.

Figure 3J:
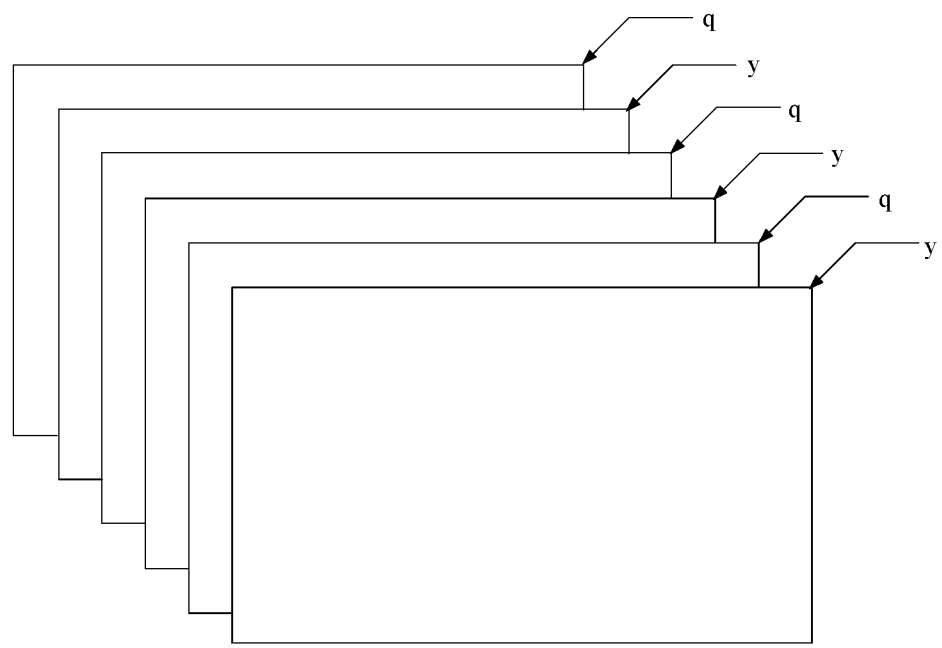
FIG. 3J is a schematic diagram of displaying the target video data and original video data provided by an embodiment of the present disclosure.
Figure 3K:
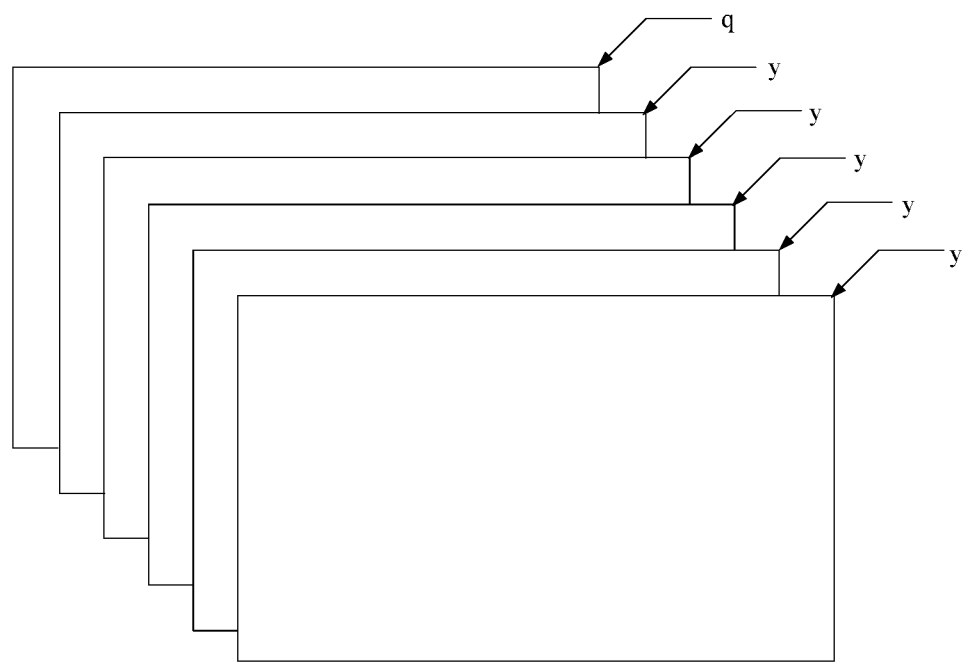
FIG. 3K is another schematic diagram of displaying the target video data and original video data provided by an embodiment of the present disclosure.

In an embodiment, the data loading device may alternately display the original video frame comprised in the original video data and the target video frame comprised in the target video data. For example, as shown in FIG. 3J, after displaying an original video frame y, the data loading device may display a target video frame q corresponding to the original video frame y. Alternatively, as shown in FIG. 3K, after displaying a plurality of original video frames y, the data loading device may display a target video frame q corresponding to the last frame of the plurality of original video frames. Of course, there may be other manners of displaying the target video data and the original video data.

The data transmission method provided by the embodiments of the present disclosure has a higher transmission rate because the number of original video frames and target video frames displayed per second is greater when the video loading device is playing the video. The data loading device transmits data when playing Full High Definition video and the length of the data segment is 1 bit. The data transmission rate may be as follows:

1920×1080×30 b/s=7594 Mb/s, wherein, 1920 is the number of pixel points comprised in each line of the full HD video frame, 1080 is the number of pixel points comprised in each column of the full HD video frame, and 30 is the number of the original video frames displayed per second during playing full HD video.

At step 305, the data parsing device collects the target video data and the original video data displayed by the data loading device.

In an embodiment, the data loading device may prompt the user by using a pop-up window or a prompt tone before the data transmission is performed. After receiving the prompt, the user may open the camera of the data parsing device and collect the target video data and the original video data displayed by the data loading device by means of camera shooting or scanning. In addition, the user may also preset the data parsing device to a predetermined position, which is a position capable of capturing the contents displayed by the data loading device, and then the data loading device may send a data receiving instruction to the data parsing device when performing data transmission. After receiving the data receiving instruction, the data parsing device may open its own camera to collect the target video data and the original video data displayed by the data loading device by means of camera shooting or scanning.

It should be noted that the manner in which the data parsing device provided in the above description collects the target video data and the original video data displayed by the data loading device is merely exemplary and other collecting methods may also exist.

At step 306, the data parsing device parses the original video data and the target video data to obtain data to be transmitted.

For each target video frame in the target video data, the data parsing device may acquire the grayscale change value of each target pixel point in the target video frame compared to the corresponding original pixel point and acquire a data segment corresponding to each grayscale change value to get a binary data string, as well as converting it into original data. The original data corresponding to the plurality of target video frames may constitute the data to be transmitted.

Figure 3L:
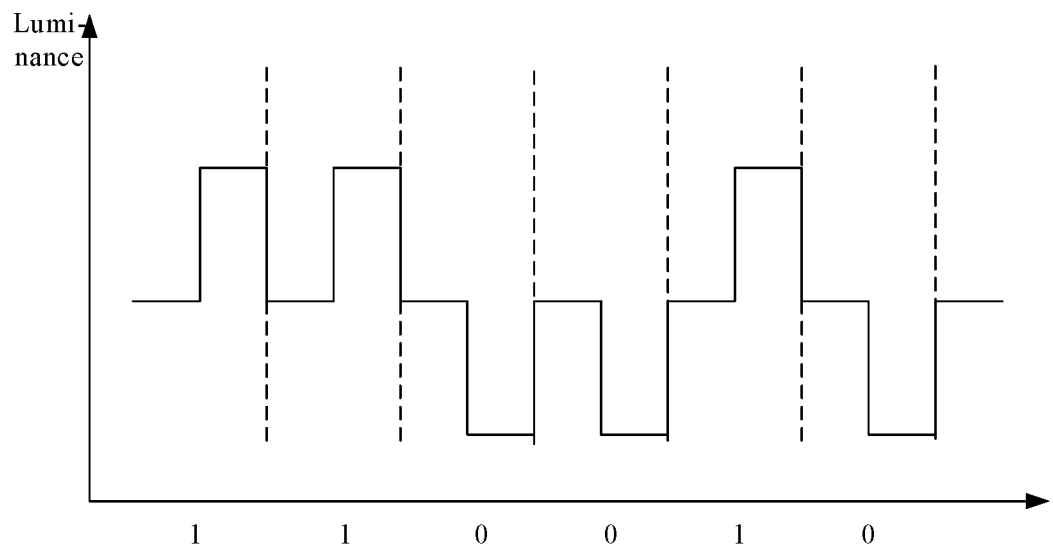
FIG. 3L is a schematic diagram of luminance changes of six target pixel points compared to respective original pixel points provided by an embodiment of the present disclosure.

As described above, the data parsing device may obtain the data to be transmitted by judging the change in the luminance of the target pixel point in the target video data compared to the luminance of the corresponding original pixel point. For example, FIG. 3L shows a schematic diagram of the luminance changes of six target pixel points compared to respective original pixel points. According to the schematic diagram, it may be seen that the data segments corresponding to the six target pixel points are 1, 1, 0, 0, 1, and 0, respectively.

In summary, in the data transmission method provided by the embodiment of the present disclosure, the data loading device processes the original video data by using the data to be transmitted to obtain the target video data, and displays the original video data and the target video data, so that the data parsing device which has collected the displayed original video data and the target video data may obtain the data to be transmitted according to the original video data and the target video data. Since both the display and the collection of the original video data and the target video data are performed in the visible light band, there is no need to occupy the wireless spectrum resources. Therefore, the data transmission method provided by the embodiments of the present disclosure may be free from the limited wireless spectrum resources.

Figure 4:
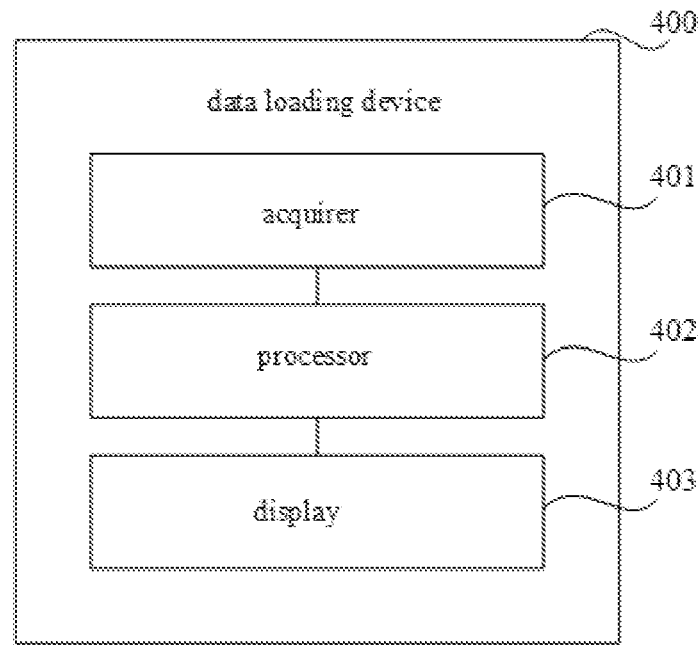
FIG. 4 is a structural block diagram of a data loading device according to an embodiment of the present disclosure.

FIG. 4 is a block diagram of a data loading device 400 according to an embodiment of the present disclosure. Referring to FIG. 4, the device comprises an acquirer 401, a processor 402, and a display 403.

The acquirer 401 is configured to acquire the original video data and the data to be transmitted.

The processor 402 is configured to process the original video data based on the data to be transmitted to obtain the target video data. The target video data comprises processed original video data and may reflect the data to be transmitted.

The display 403 is configured to display the target video data and the original video data.

In an embodiment of the present disclosure, the original video data comprises a plurality of original video frames, and each original video frame comprises a plurality of original pixel points. The processor 402 is configured to convert the data to be transmitted into a plurality of binary data strings, wherein each binary data string comprises a plurality of data segments, the plurality of binary data strings and the plurality of original video frames are in one-to-one correspondences, and each data segment corresponds to an original pixel point of the original video frame corresponding to the binary data string to which each data segment belongs. For each binary data string, the grayscale value of the original pixel point corresponding to each data segment of the binary data string is changed according to the grayscale change value corresponding to the each data segment of the binary data string in order to obtain a plurality of target pixel points. The plurality of target pixel points constitute a target video frame, and the plurality of target video frames corresponding to the plurality of binary data strings constitute the target video data.

The data loading device provided by the embodiment of the present disclosure processes the original video data by using the data to be transmitted to obtain the target video data, and displays the original video data and the target video data, so that the data parsing device which has collected the displayed original video data and the target video data may obtain the data to be transmitted according to the original video data and the target video data. Since the display and collection of the original video data and the target video data are performed in the visible light band, there is no need to occupy the wireless spectrum resources.

Figure 5:
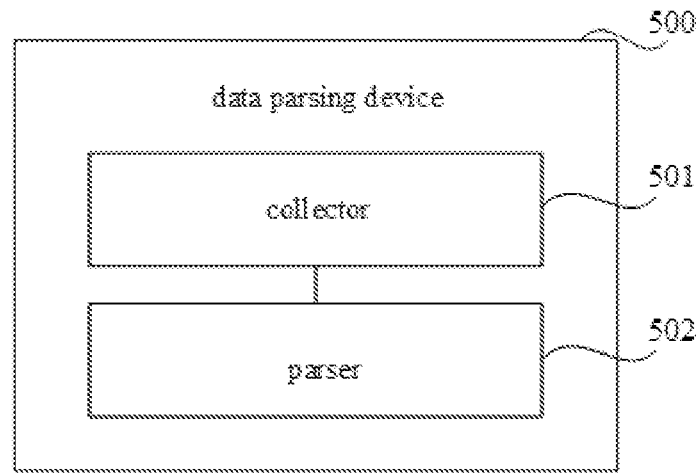
FIG. 5 is a structural block diagram of a data parsing device according to an embodiment of the present disclosure.

FIG. 5 is a block diagram of a data parsing device 500 according to an embodiment of the present disclosure. Referring to FIG. 5, the device comprises a collector 501 and a parser 502.

The collector 501 is configured to collect the original video data and the target video data, the target video data being obtained by processing the original video data according to the data to be transmitted. The target video data comprises the processed original video data and may reflect the data to be transmitted.

The parser 502 is configured to parse the original video data and the target video data to obtain the data to be transmitted.

In an embodiment of the present disclosure, the original video data comprises a plurality of original video frames, and each original video frame comprises a plurality of original pixel points. The target video data comprises a plurality of target video frames, and each target video frame comprises a plurality of target pixel points. The plurality of target video frames and the plurality of original video frames are in one-to-one correspondences, and each target pixel point corresponds to one original pixel point of the original video frame corresponding to the target video frame to which the target pixel point belongs. The parser 502 is configured to: for each target video frame, acquire a grayscale change value of each target pixel point in the target video frame compared to the corresponding original pixel point, acquire a data segment corresponding to the grayscale change value to get a binary data string, and convert the binary data string into original data. The original data corresponding to the plurality of target video frames constitute the data to be transmitted.

The data parsing device provided by the embodiments of the present disclosure collects the original video data and the target video data displayed by the data loading device, and obtains the data to be transmitted by parsing according to the original video data and the target video data, so that the display and collection of the original video data and the target video data are performed in the visible light band, Therefore, there is no need to occupy the wireless spectrum resources.

It should be noted that the division of the above components is merely exemplary. It should be further noted that any of the above functions may be performed by different components or devices, that is, the internal structure of the device is divided into different components or devices to perform all or part of the functions described above. In addition, the data loading device and the data transmission device provided by the foregoing embodiments are in the same concept as the data transmission method embodiment, and the specific implementation process is described in detail in the method embodiment, and details thereof are not described herein again.

Figure 6:
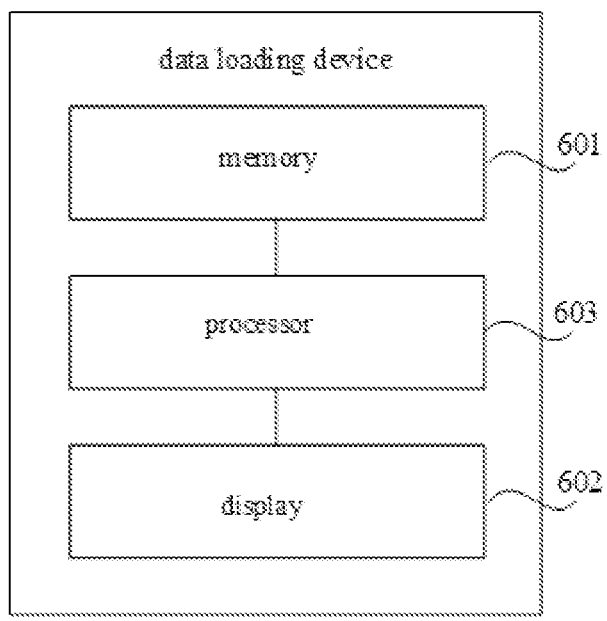
FIG. 6 is a structural block diagram of another data loading device according to an embodiment of the present disclosure.

FIG. 6 is a structural block diagram of another data loading device according to an embodiment of the present disclosure. Referring to FIG. 6, the data loading device comprises: memory 601, display 602, and processor 603 comprising one or more processing cores. Those skilled in the art will appreciate that the structure illustrated in FIG. 6 does not constitute a limitation to the data loading device. It should be understood that the data loading device may comprise more or fewer components than illustrated.

The memory 601 stores software programs and modules, and the processor 603 executes various functional applications and data processing by running software programs and modules stored on the memory 601, The memory 601 may mainly comprise a program storage area and a data storage area, wherein the program storage area may store an operating system, an application required for at least one function (such as a sound playing function, an image playing function, etc.), and the like; the data storage area may store the data created according to the use of the data loading device (such as audio data, etc.) and the like. Further, the memory 601 may comprise random access memory (RAM), nonvolatile memory (such as any one or more of read only memory (ROM), flash memory, EPROM, EEPROM, etc.), and a disk storage device. Accordingly, memory 601 may also comprise a memory controller to provide processor 603 access to memory 601.

The display 602 may be used to display video, images, or the like. The display 602 may comprise a display panel. Alternatively, the display panel may be configured in the form of an LCD (Liquid Crystal Display), an OLED (Organic Light-Emitting Diode), an LED (Light. Emitting Diode), or the like.

The processor 603 may perform the acquisition or processing function of the data loading device by running or executing software programs and/or modules stored in the memory 601, as well as acquiring the data stored in the memory 601. Alternatively, the processor 603 may comprise one or more processing cores.

In an exemplary embodiment, there is also provided a non-transitory computer readable storage medium, wherein when the instructions in the storage medium are executed by the processor of the data loading device, enabling the data loading device to perform the data transmission method described above: for example, acquiring the original video data; acquiring the data to be transmitted; processing the original video data according to the data to be transmitted to obtain the target video data, wherein the target video data comprises the processed original video data and can reflect the data to be transmitted; displaying the target video data and the original video data.

Figure 7:
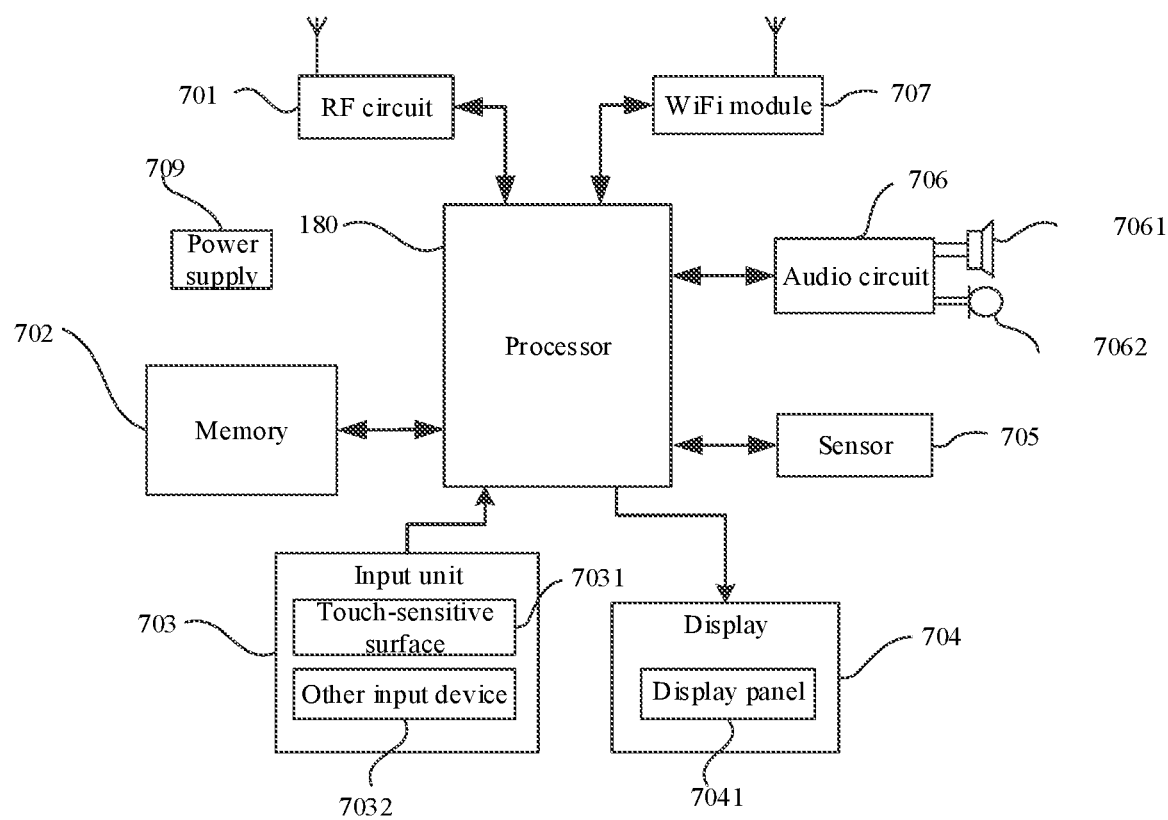
FIG. 7 is a structural block diagram of another data parsing device according to an embodiment of the present disclosure.

FIG. 7 is a structural block diagram of another data parsing device according to an embodiment of the present disclosure. Referring to FIG. 7, the data parsing device may comprise an RF (Radio Frequency) circuit 701, a memory 702, an input unit 703, a display 704, a sensor 705, an audio circuit 706, a WiFi (Wireless Fidelity) module 707, a processor 708 with one or more processing cores, a power supply 709, and a camera 710. Those skilled in the art will appreciate that the structure illustrated in FIG. 7 does not constitute a limitation to the data parsing device. It should be understood that the data parsing device may comprise more or fewer components than illustrated.

The RF circuit 701 may be configured to transmit and receive information or receive and transmit signals during a call. Specifically, after receiving the downlink information of the base station, the RF circuit passes it to the processor 708 for processing; and the RF circuit transmits data related to the uplink to the base station. Generally, the RF circuit 701 comprises, but is not limited to, an antenna, at least one amplifier, a tuner, one or more oscillators, a Subscriber Identity Module (SIM) card, a transceiver, a coupler, an LNA (Low Noise Amplifier), duplexer, etc. In addition, the RF circuit 701 may also communicate with the network and other devices through wireless communication. The wireless communication may use any communication standard or protocol, comprising but not limited to GSM (Global System of Mobile communication), GPRS (General Packet Radio Service), CDMA (Code Division Multiple Access), Code Division Multiple Access), WCDMA (Wideband Code Division Multiple Access), LTE (Long Term Evolution), e-mail, SMS (Short Messaging Service), and the like.

The memory 702 may be configured to store software programs and modules, and the processor 708 executes various functional applications and data processing by running software programs and modules stored in the memory 702. The memory 702 may mainly comprise a program storage area and a data storage area, wherein the program storage area may store an operating system, an application required for at least one function (such as a sound playing function, an image playing function, etc.), and the like; the data storage area may store data (such as audio data, phone book, etc.) created according to the use of the data parsing device. Further, the memory 702 may comprise random access memory (RAM), nonvolatile memory (such as any one or more of read only memory (ROM), flash memory, EPROM, EEPROM, etc.), and a disk storage device. Accordingly, memory 702 may also comprise a memory controller to provide access to memory 702 by processor 708 and input unit 703.

The input unit 703 may be configured to input an input signal related to user settings and function control via its input. In particular, input unit 703 may comprise touch-sensitive surface 7031 as well as other input device 7032. Touch-sensitive surface 7031, also known as a touch display or trackpad, may collect touch operations on or near the user (such as an operation performed by a user using any suitable object or accessory (such as a finger, stylus, or the like) on or near the touch-sensitive surface 7031) and drive the corresponding connecting device according to a preset program. Alternatively, the touch sensitive surface 7031 may comprise a touch detection device and a touch controller. The touch detection device detects the user's touch orientation and detects the involved signal, and transmits the signal to the touch controller; the touch controller receives the touch information from the touch detection device and converts it into contact coordinates, and then sends it to the processor 708. The touch detection device may also receive commands from the processor 708 and execute them. In addition, the touch sensitive surface 7031 may be implemented in various types such as resistive, capacitive, infrared, and surface acoustic waves. In addition to the touch-sensitive surface 7031, the input unit 703 may also comprise other input device 7032. Specifically, other input device 7032 may comprise, but is not limited to, one or more of a physical keyboard, a function key (such as a volume control button, a switch button, etc.), a trackball, a mouse, a joystick, and the like.

Display 704 may be configured to display information entered by the user or information provided to the user and various graphical user interfaces of the data parsing device, which may be constructed from graphics, text, icons, video, and any combination thereof. Display 704 may comprise a display panel 7041. Alternatively, the display panel 7041 may be configured in the form of an LCD (Liquid Crystal Display), an OLED (Organic Light-Emitting Diode), or the like. The touch sensitive surface 7031 may cover the display panel 7041, and when the touch sensitive surface 7031 collects a touch operation thereon or nearby, it is transmitted to the processor 708 to determine the type of the touch event, and then the processor 708 provides a corresponding visual output on display panel 7041 based on the type of the touch event. Although in FIG. 7, touch-sensitive surface 7031 and display panel 7041 are implemented as two separate components to implement input and output functions, in some embodiments, touch-sensitive surface 7031 may be integrated with display panel 7041 to implement input and output functions.

The data parsing device may also comprise at least one type of sensor 705, such as a light sensor, motion sensor, and other sensors. In particular, the light sensor may comprise an ambient light sensor and a proximity sensor. The ambient light sensor may adjust the luminance of the display panel 7041 according to the luminance of the ambient light, and the proximity sensor may turn off the display panel 7041 and/or the backlight when the data parsing, device moves to the ear. As a kind of motion sensor, the gravity acceleration sensor may detect the magnitude of acceleration in all directions (usually three axes), and the magnitude and direction of gravity may be detected at rest. The data parsing device may be equipped with other sensors such as a gyroscope, a barometer, a hygrometer, a thermometer, and an infrared sensor.

Audio circuit 706, speaker 7061, and microphone 7062 may provide an audio interface between the user and the data parsing device. The audio circuit 706 may convert the received audio data into an electrical signal, then transmit it to the speaker 7061, and convert it into a sound signal output by the speaker 7061; on the other hand, the microphone 7062 may convert the collected sound signal into an electrical signal, and then converted it into audio data after received by the audio circuit 706. The audio data may be processed by the processor 708, sent via RF circuitry 701 to, for example, another data parsing device, or the audio data may be stored in memory 702 for further processing. The audio circuit 706 may also comprise an earbud jack to provide communication of the peripheral earphones with the data parsing device. Of course, the data parsing device further comprises a video interface such as a camera as described above for collecting video data.

WiFi is a short-range wireless transmission technology. Through the WiFi module 707, the user may send and receive emails, browse web pages, and access streaming media, etc., which provides user with wireless broadband Internet access. Although FIG. 7 shows the WiFi module 707, it may be understood that it does not belong to an essential part of the data parsing device, and may be omitted as needed within the scope of not changing the essence of the disclosure.

The processor 708 is a control center of the data parsing device, which connects the various components of the entire data parsing device with various interfaces and lines, and performs the parsing and processing functions of the data parsing device by running or executing software programs and/or modules stored in the memory 702, as well as invoking data stored in memory 702. Alternatively, processor 708 may comprise one or more processing cores. The processor 708 may also integrate an application processor and a modulation and demodulation processor, wherein the application processor mainly processes an operating system, a user interface, an application, etc., and the modulation and demodulation processor mainly processes wireless communication. It will be appreciated that the above described modulation and demodulation processor may also not be integrated into the processor 708.

The data parsing device also comprises a power source 709 (such as a battery) that supplies power to the various components. The power supply may be logically coupled to the processor 708 through a power management system to enable functions such as charging, discharging, and managing power consumption through the power management system. The power supply 709 may also comprise one or more of a DC or AC power source, a recharging system, a power failure detection circuit, a power converter or inverter, a power status indicator, and the like.

In an exemplary embodiment, there is also provided a non-transitory computer readable storage medium, wherein when the instructions in the storage medium are executed by the processor of the data parsing device, enabling the data parsing device to perform the data transmission method described above: for example, collecting the target video data and the original video data; for each target video frame in the target video data, acquiring grayscale change value of each target pixel point in the target video frame compared to the corresponding original pixel point, acquiring a data segment corresponding to the grayscale change value to get a binary data string, and converting the binary data string into original data, wherein the original data corresponding to all the target video frames constitute the data to be transmitted.

Those skilled in the art will appreciate that all or part of the steps of implementing the above embodiments may be performed by hardware, or may be performed by a program instructing related hardware, and the program may be stored in a computer readable storage medium. The storage medium mentioned above may be a read only memory, a magnetic disk or an optical disk or the like.

What stated above are merely embodiments of the present disclosure but are not used to limit the present disclosure. Any modification, equivalent, improvement, etc. within the spirit and principle of the present disclosure should be contained within the scope of the present disclosure.

The invention claimed is:

1. A data transmission method for a data loading device, comprising:
acquiring original video data, wherein the original video data comprises a plurality of original video frames comprising a respective plurality of original pixel points;
acquiring data to be transmitted;
converting the data to be transmitted into a plurality of binary data strings, wherein the plurality of binary data strings and the plurality of original video frames are in one-to-one correspondences, wherein ones of the plurality of binary data strings comprise a plurality of data segments respectively corresponding to an original pixel point of a respective one of the original video frames corresponding to a respective one of the plurality of binary data strings to which a respective one of the plurality of data belongs, wherein a number of data segments is less than or equal to a number of the original pixel points;
changing a grayscale value of a respective one of the plurality of original pixel points corresponding to a respective data segment of the respective one of the plurality of binary data strings according to a first grayscale change value corresponding to the respective data segment in order to obtain a plurality of target pixel points,
wherein the plurality of target pixel points comprise one target video frame, and a plurality of target video frames correspond to the plurality of binary data strings that comprise target video data; and
displaying the target video data and the original video data, wherein both the target video data and the original video data are used in combination for restoring the data to be transmitted.

2. The data transmission method of claim 1, wherein the first grayscale change value comprises at least one of a second grayscale change value of a red subpixel, a third grayscale change value of a green subpixel, and a fourth grayscale change value of a blue subpixel.

3. The data transmission method of claim 1, wherein the changing the grayscale value of the respective one of the plurality of original pixel points corresponding to a respective data segment of the respective one of the plurality of binary data strings comprises:
decreasing the grayscale value of the corresponding original pixel point by a first change value in response to the data segment being 0; and
increasing the grayscale value of the corresponding original pixel point by a second change value in response to the data segment being 1.

4. The data transmission method of claim 1, the method further comprising:
after displaying the target video data and the original video data:
collecting the target video data that was displayed and the original video data; and
for ones of the target video frames in the target video data, acquiring a grayscale change value of a respective target pixel point in a respective target video frame compared to a corresponding original pixel point, and acquiring a data segment corresponding to the grayscale change value so as to obtain a binary data string, and converting the binary data string into original data, wherein the original data corresponding to the plurality of target video frames comprises the data to be transmitted.

5. A data loading device comprising:
an acquirer configured to acquire original video data and data to be transmitted, wherein the original video data comprises a plurality of original video frames comprising a respective plurality of original pixel points;
a processor, configured to convert the data to be transmitted into a plurality of binary data strings, wherein the plurality of binary data strings and the plurality of original video frames are in one-to-one correspondence, wherein ones of the plurality of binary data strings comprises a plurality of data segments, and wherein ones of the plurality of data segments corresponds to an original pixel point of the pluralit of original pixel points of a respective original video frame of the plurality of original frames that corresponds to a respective one of the plurality of binary data strings to which a respective data segment of the pluralit of data segments belongs, wherein a number of data segments is less than or equal to a number of the original pixel points;
for ones of the plurality of binary data strings, change a grayscale value of the original pixel point corresponding to a respective data segment of the plurality of data segments of a respective binary data string of the plurality of binary data strings according to a gray-scale change value corresponding to the respective data segment in order to obtain a plurality of target pixel points,
wherein the plurality of target pixel points comprise one tar et video frame, and.
wherein a plurality of target video frames corresponding to the plurality of binary data strings comprise target video data; and
a display configured to display the target video data and the original video data, wherein both the target video data and the original video data are used in combination for restoring the data to be transmitted.

6. A data parsing device, comprising:
a collector configured to collect original video data and target video data, wherein the target video data is obtained by encoding the data to be transmitted into encoded data and incorporating the encoded data to be transmitted in pixels of the original video data; and
a parser configured to parse the original video data and the target video data to obtain the data to be transmitted,
wherein the original video data comprises a plurality of original video frames, wherein ones of the original video frames comprise a plurality of original pixel points,
wherein the target video data comprises a plurality of target video frames, and ones of the target video frames comprise a plurality of target pixel points,
wherein the plurality of target video frames and the plurality of original video frames are in one-to-one correspondence,
wherein ones of the target pixel points correspond to a respective original pixel point of the original video frame according to the target video frame to which the target pixel point belongs, and
wherein the parser is further configured to acquire, for each target video frame, a respective grayscale change value of ones of the target pixel points in the target video frame compared to the corresponding original pixel point and acquire a respective data segment corresponding to the respective grayscale change value to obtain a respective binary data string, and convert the respective binary data string into original data, wherein the original data corresponding to the plurality of target video frames comprises the data to be transmitted, wherein a number of data segments is less than or equal to a number of the original pixel points.

7. A data transmission system, comprising the data loading device of claim 5, and a data parsing device, wherein data parsing device comprises:
a collector configured to collect the original video data and the target video data, wherein the target video data is obtained by encoding the data to be transmitted into encoded data, and incorporating the encoded data to be transmitted in pixels of the original video data; and
a parser configured to parse the original video data and the target video data in combination to obtain the data to be transmitted.

8. The data transmission system of claim 7,
wherein the original video data comprises a plurality of original video frames,
wherein ones of the original video frames comprise a plurality of original pixel points,
wherein the target video data comprises a plurality of target video frames,
wherein ones of the plurality of target video frames comprise a plurality of target pixel points,
wherein the plurality of target video frames and the plurality of original video frames are in one-to-one correspondence, and ones of the plurality of target pixel points correspond to a respective original pixel point of a respective one of the plurality of the original video frames according to a respective one of the plurality of target video frames to which a respective one of the plurality of target pixel points belongs,
wherein the parser is further configured to acquire, for ones of the plurality of target video frames, a respective grayscale change value of respective ones of the plurality target pixel points in the respective one of the plurality of target video frames compared to a corresponding original pixel point and acquire a respective data segment corresponding to the respective grayscale change value to obtain a binary data string, and configured to convert the binary data string into original data, and
wherein the original data corresponding to the plurality of target video frames comprise the data to be transmitted.

9. The data transmission system of claim 7, wherein the original video data comprises a plurality of original video frames, wherein ones of the original video frames comprise a respective plurality of original pixel points, wherein the processor is further configured to perform operations comprising:
converting the data to be transmitted into a plurality of binary data strings, wherein the plurality of binary data strings and the plurality of original video frames are in one-to-one correspondences, ones of the binary data strings comprise a plurality of data segments, and ones of the data segments correspond to an original pixel point of the original video frame corresponding to a respective binary data string to which a respective data segment belongs;
changing, for ones of the binary data strings, the respective grayscale value of the original pixel point corresponding to the respective data segment of the respective binary data string according to a gray scale change value corresponding to the respective data segment in order to obtain a plurality of target pixel points,
wherein a plurality of target pixel points comprise one target video frame, and a plurality of target video frames corresponding to the plurality of binary data strings comprise the target video data.

10. The data transmission method of claim 1, wherein displaying the target video data and the original video data comprises any of the following way:
after displaying an original video frame that is in the original video data, displaying a target video frame corresponding to the original video frame that is in the target video data, or
after displaying a plurality of original video frames that are in the original video data, displaying a target video frame corresponding to a last frame of the plurality of original video frames that are in the target video data.

11. The data loading device of claim 5, wherein the display is configured to perform any of the following actions:
displaying, after displaying an original video frame that is in the original video data, a target video frame corresponding to the original video frame that is in the target video data, or
displaying, after displaying a plurality of original video frames that are in the original video data, a target video frame corresponding to a last frame of the plurality of original video frames that are in the target video data.

12. The data loading device of claim 5, wherein the data loading device comprises at least one of a television or a computer.

13. The data parsing device of claim 6, wherein the data parsing device comprises at least one of a smart phone or a tablet computer.

14. The data transmission method of claim 1, wherein the displaying the target video data and the original video data further comprises:
alternately displaying frames of the original video data and frames of the target video data, and transmitting the data to be transmitted with changes of grayscale values of pixels in frames of the original video data as compared to pixels in frames of the target video data.

15. The data loading device of claim 5, wherein the displayer is further configured to alternately display frames of the original video data and frames of the target video data, and transmit the data to be transmitted with changes of grayscale values of pixels in frames of the original video data as compared to pixels in frames of the target video data.

16. The data transmission system of claim 7, wherein the original video data comprises a plurality of original video frames comprising a respective plurality of original pixel points, wherein the processor is further configured to perform operations comprising:
converting the data to be transmitted into a plurality of binary data strings, wherein the plurality of binary data strings and the plurality of original video frames are in one-to-one correspondence, wherein ones of the plurality of binary data strings comprises a plurality of data segments, and wherein ones of the plurality of data segments corresponds to an original pixel point of the plurality of original pixel points of a respective original video frame of the plurality of original frames that corresponds to a respective one of the plurality of binary data strings to which a respective data segment of the plurality of data segments belongs;
for ones of the plurality of binary data strings, changing a grayscale value of the original pixel point corresponding to a respective data segment of the plurality of data. segments of a respective binary data string of the plurality of binary data strings according to a grayscale change value corresponding to the respective data segment in order to obtain a plurality of target pixel points,
wherein the parser is further configured to obtain the data to be transmitted by judging the change in luminance of the target pixel point in the target video data compared to the luminance of the corresponding original pixel point.

\* \* \* \* \*